(12) United States Patent
Keogh

(10) Patent No.: US 7,849,669 B2
(45) Date of Patent: Dec. 14, 2010

(54) TURBOFAN ENGINE UTILIZING AN AERODYNAMICALLY COUPLED PRE-COMBUSTION POWER TURBINE

(76) Inventor: Rory Keogh, 4545 California St., San Francisco, CA (US) 94118

( * ) Notice: Subject to any disclaimer, the term of this patent is extended or adjusted under 35 U.S.C. 154(b) by 1079 days.

(21) Appl. No.: 11/467,913

(22) Filed: Aug. 28, 2006

(65) Prior Publication Data

US 2009/0145106 A1    Jun. 11, 2009

(51) Int. Cl.
*F02C 6/00* (2006.01)
*F02G 3/00* (2006.01)
*F02G 1/00* (2006.01)

(52) U.S. Cl. .................................. 60/39.181
(58) Field of Classification Search .............. 60/39.181, 60/39.183, 39.43, 226.1, 791, 792, 39.17
See application file for complete search history.

(56) References Cited

U.S. PATENT DOCUMENTS

| | | | | |
|---|---|---|---|---|
| 2,361,887 A | * | 10/1944 | Traupel | 60/39.183 |
| 3,365,892 A | * | 1/1968 | Derderian | 60/269 |
| 3,486,328 A | * | 12/1969 | Boudigues | 60/39.181 |
| 5,927,065 A | * | 7/1999 | Cotton | 60/39.183 |
| 6,209,311 B1 | * | 4/2001 | Itoh et al. | 60/226.3 |
| 6,792,746 B2 | * | 9/2004 | Saito et al. | 60/224 |

* cited by examiner

*Primary Examiner*—Michael Cuff
*Assistant Examiner*—Andrew Nguyen
(74) *Attorney, Agent, or Firm*—Fenwick & West LLP

(57) ABSTRACT

A turbofan jet engine design that utilizes aerodynamic coupling to transmit power from a high-speed engine core to a lower speed fan, thereby simplifying the design and improving the thrust-to-weight ratio compared to previous turbofan designs. The engine uses a low speed co-rotating power turbine located upstream of the engine core to drive the fan. The high-speed core uses a centrifugal impeller to pressurize the inlet flow, the flow exits the high-speed impeller without diffusing its high-speed angular momentum and enters directly into the low speed co-rotating power turbine impeller. The incoming flow is then turned by the low speed co-rotating turbine impeller and exits the turbine opposing its direction of rotation, thereby extracting power from the flow to drive the fan. The exit flow from the low speed power turbine then enters the combustor inlet. This engine configuration enables the power turbine to be constructed from high strength, low-density materials (that are not suitable for use in higher temperature power turbines) thereby reducing the weight of the engine. This engine configuration also eliminates the need for the core compressor diffuser, the power turbine nozzle guide vanes, and the low speed shaft that connects the fan to the power turbine in conventional turbofans.

17 Claims, 15 Drawing Sheets

TURBOFAN ENGINE UTILIZING AN AERODYNAMICALLY COUPLED PRE-COMBUSTION POWER TURBINE

FIELD OF THE INVENTION

The present invention relates to turbofan jet engines. Even more particularly, this invention relates to turbofan jet engines having improved thrust-to-weight ratio, and low manufacturing costs when compared to previous turbofan engine designs.

BACKGROUND OF THE INVENTION

The overall objective for a jet is to convert stored chemical energy in the form of fuel into thrust to propel an aircraft. Early jet engines operate by compressing inlet flow to a high pressure and adding and combusting fuel to achieve a high temperature gas, which then expands across a high-pressure turbine, the power from which is used to drive the compressor. Excess pressure at the turbine exit is used to accelerate the core flow through an exhaust nozzle, thereby achieving high velocities to propel the jet-powered aircraft. Even though early jet engine designs were relatively inefficient, the exhaust velocities were well matched to many jet early aircraft needs.

Turbine temperature limits have continued to increase thereby improving the thermal efficiency of the jet engine core and resulting in higher core turbine exit pressures. However for a turbojet configuration the resulting nozzle exhaust velocities are no longer well matched to most jet aircraft applications, resulting in reduced propulsive efficiency. To overcome these problems turbofan jet engines were developed whereby a power turbine is configured on a separate spool downstream of the core turbine, and the power extracted is used to drive a fan, most of the flow from which bypasses the engine core. The resulting lower velocities from the core and fan nozzles are well matched to most jet aircraft application, resulting in high propulsive efficiency. The combination of high core thermal efficiency and the high turbofan propulsive efficiency have enabled numerous advanced aircraft configurations.

Current turbofan configurations, however, have some drawbacks. Because the fan is generally configured upstream of the core and the power turbine is downstream of the core, an additional shaft must connect the two, which adds additional cost and weight to the engine. Also, the power turbine, which is typically manufactured from high-density nickel super-alloys and is very large relative to the core turbine, adds considerable cost, weight and size to the engine. The added weight, of the additional shaft and power turbine tends to reduce the engine thrust-to-weight ratio. Therefore, while conventional turbofans have proven attractive for many jet aircraft applications, such configurations have not proven attractive as lift engines because of the added cost, weight and size.

Accordingly, a need exists for a turbofan engine with an effective drive mechanism to link the high speed core compressor with the low speed fen, which would improve the engine thrust-to-weight ratio and which would be less costly to manufacture than a traditional turbofan engine.

SUMMARY OF THE INVENTION

The present invention achieves these and other objectives by providing a turbofan engine design where the fan is operatively connected to and powered by a pre-combustion power turbine that is aerodynamically coupled to the high-speed core spool. The aerodynamic coupling occurs wherein a high-speed core compressor impeller is configured to discharge a high velocity compressed flow directly into to a low-speed pre-combustion power turbine impeller.

Other objects will, in part, be obvious and will, in part, appear hereinafter. The invention accordingly, comprises the features of construction, combination of elements and arrangements of parts, which will be exemplified in the toll owing detailed description and the scope of the invention will be indicated in the claims.

According to one aspect of the invention a turbofan engine includes a fan assembly operatively connected to a pre-combustion turbine, wherein the pre-combustion turbine operatively powers the fan assembly.

As to another aspect of the invention the turbofan engine further includes a compressor assembly operatively coupled with the pre-combustion turbine.

As to yet another aspect of the invention the compressor assembly is aerodynamically coupled with the pre-combustion turbine.

As to yet another aspect of the invention the pre-combustion turbine co-rotates with the compressor assembly.

As to yet another aspect of the invention the compressor assembly is arranged to discharge a tangential flow into the co-rotating pre-combustion turbine, thereby powering the turbine.

As to yet another aspect of the invention the turbofan engine further comprises a first spool assembly and a second spool assembly wherein the first spool assembly comprises the pre-combustion turbine and the fen assembly and wherein the second spool assembly comprises a compressor assembly operatively connected with a high speed turbine and wherein the compressor assembly is aerodynamically coupled with the pre-combustion turbine.

As to yet another aspect of the invention the compressor assembly includes a centrifugal impeller.

As to yet another aspect of the invention the turbofan engine further comprises a plurality of inlet vanes, which operatively direct an inlet flow into the compressor assembly.

As to yet another aspect of the invention the plurality of inlet vanes are variable, whereby the angle of the inlet flow may be adjusted.

According to another aspect of the invention a turbofan engine includes a core compressor and a power turbine operatively connected to the core compressor wherein the power turbine receives and is powered by a pre-combustion flow.

As to another aspect of the invention the core compressor includes an impeller assembly and a diffuser assembly.

As to yet another aspect of the invention the power turbine is downstream of the core compressor.

As to yet another aspect of the invention the power turbine is upstream of the core compressor.

According to another aspect of the invention an engine includes a rotating compressor assembly and a co-rotating turbine assembly aerodynamically couple with the compressor assembly, wherein the compressor assembly is arranged to discharge a tangential flow into the co-rotating turbine, thereby powering the turbine.

As to another aspect of the invention the turbine assembly operatively powers a fan assembly.

As to yet another aspect of the invention the turbine assembly operatively powers a generator.

As to yet another aspect of the invention the turbine assembly operatively powers an external mechanical load.

As to yet another aspect of the invention the engine further comprises at least one additional compressor assembly and at least one additional co-rotating turbine assembly operatively connected with the first said compressor assembly and the first said co-rotating turbine assembly.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Figure 1:
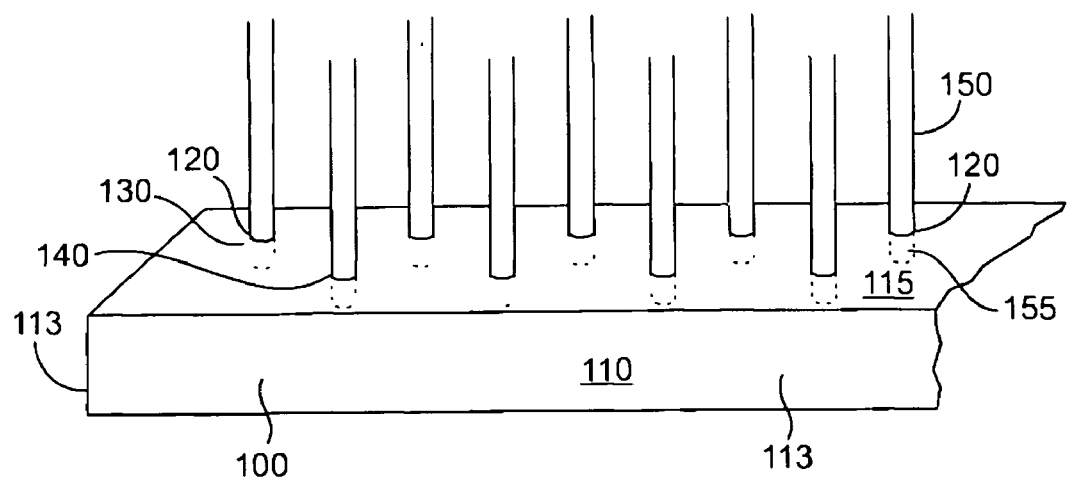
FIG. 1 is a fragmentary perspective view through the proposed turbofan engine utilizing an aerodynamically coupled pre-combustion power turbine. Fragments are removed from the non-rotating structure and from the low-speed fan spool to expose the engine core spool.

Preferred embodiments of the present invention are illustrated in FIGS. 1-16. Referring now to FIGS. 1-8, aerodynamically coupled pre-combustion power turbine, generally designated by the numeral 10, is shown. The turbofan engine 10 includes a low-speed fan spool 12 and a high-speed core spool 14. The low-speed fan spool 12 contains a low-speed co-rotating power turbine 20, which is aerodynamically coupled to a high-speed compressor assembly IS, on the high-speed core spool 14.

An air flow 6 enters the turbofan engine 10 through a high-speed core impeller inlet port 16, and is compressed by the motion of a series of high-speed core impeller blades 38, which forces the air flow radially outward. The air flow leaves the high-speed compressor assembly 18, with a high tangential velocity, and enters the low-speed co-rotating power turbine 20.

The low-speed co-rotating power turbine 20, extracts power from the air flow to drive a low-speed fan 32. In the present embodiment the low-speed fan 32 and the low-speed co-rotating power turbine 20 are fixed together on the low-speed fan spool 12. A series of low-speed power turbine blades 46, take the incoming tangential flow and reverse its direction. The flow then leaves the low-speed co-rotating power turbine 20, and enters a fixed power turbine exit diffuser 22, where the air flow velocity is reduced.

The air flow then leaves the power turbine exit diffuser 22, and enters a fixed combustion system 24, where fuel is added and combusted to increase the temperature (and energy content) of the air flow.

The air flow then leaves the combustion system 24, and enters a high-speed core turbine system 26, where power is extracted from the air flow to drive the high-speed compressor assembly 18. The high-speed core turbine system 26, and high-speed compressor assembly 18 are connected by a high-speed shaft 62, and together these comprise the high-speed core spool 14. The air flow then leaves the turbofan engine 10, through a fixed engine core exit nozzle 28.

A second large volume air flow 8 enters the low-speed fan inlet port 30, where it is pressurized by a low-speed fan 32. The large volume of air flow 8 then expands to a high velocity in a fixed engine fan exit nozzle 36.

The high-speed core impeller flow path is formed by a series of high-speed core impeller blades 38, a high-speed core impeller disk 40 and a low-speed core impeller shroud 42 that is mechanically attached to the low-speed fan spool 12.

The flow path of the low-speed co-rotating power turbine 20 is formed by a low-speed power turbine shroud 44, the series of low-speed power turbine blades 46 and a low-speed power turbine hub 48.

The low-speed fan spool 12 is supported and centered by a low-speed power turbine shaft 50 that extends from the low-speed power turbine hub 48. The low-speed power turbine shaft 50 is attached to an engine fixed support structure 58 through a set of low-speed bearings 60.

The high-speed core turbine 26 is attached to the high-speed compressor assembly 18 by a high-speed shaft 62. The high-speed shaft 62 is attached to the engine fixed support structure 58 through a set of high-speed bearings 64.

In the present embodiment the low-speed fan spool 12 rotates about at approximately one half the speed of the high-speed core spool 14, about a common axis of rotation and in the same direction.

Figure 4:
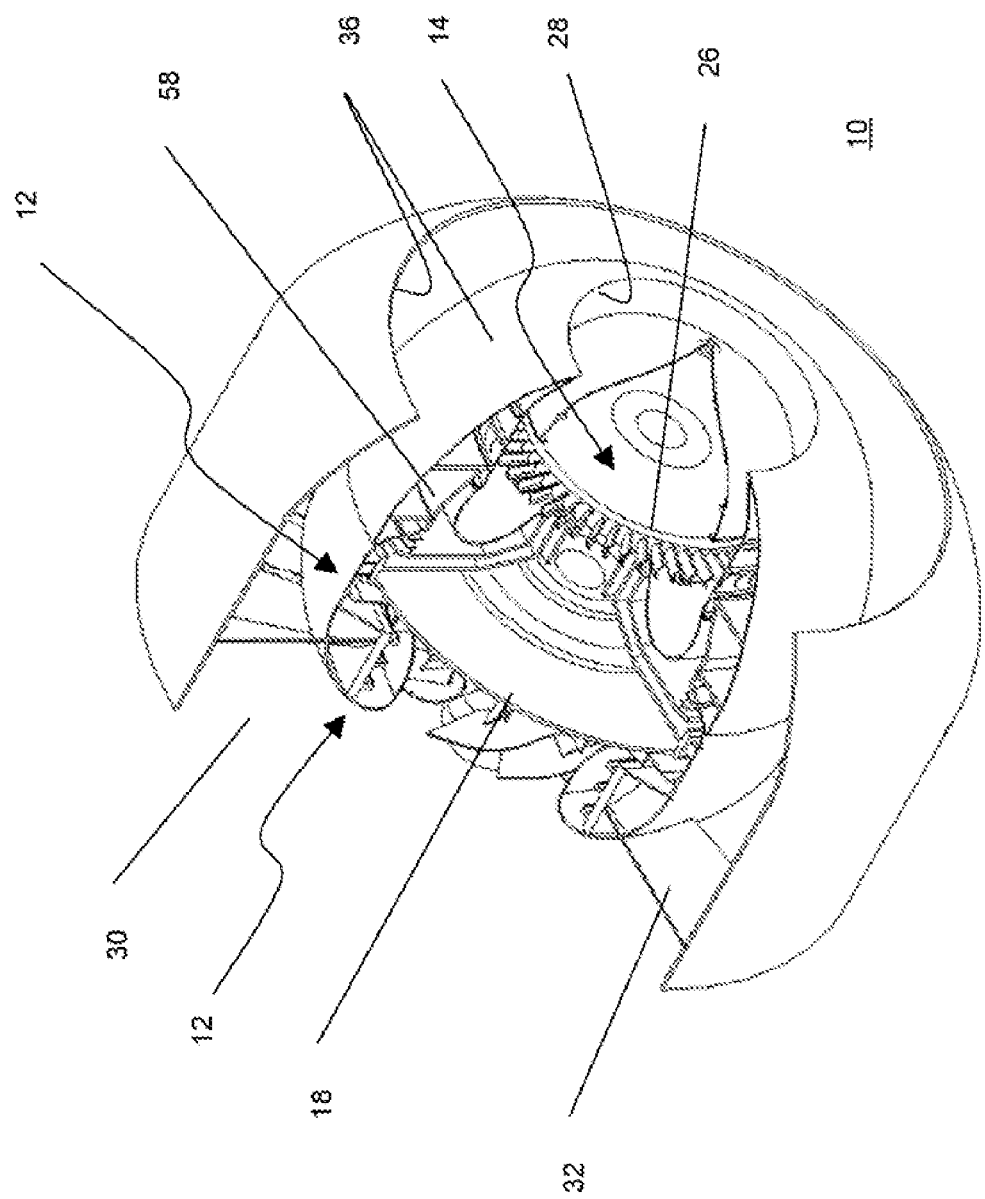
FIG. 4 is a fragmentary perspective view through the proposed aerodynamically coupled pre-combustion power turbine. Fragments are removed from the non-rotating structure and from the low speed fan spool to expose the engine core spool. The perspective view is from the aft end of the engine.
Figure 5:
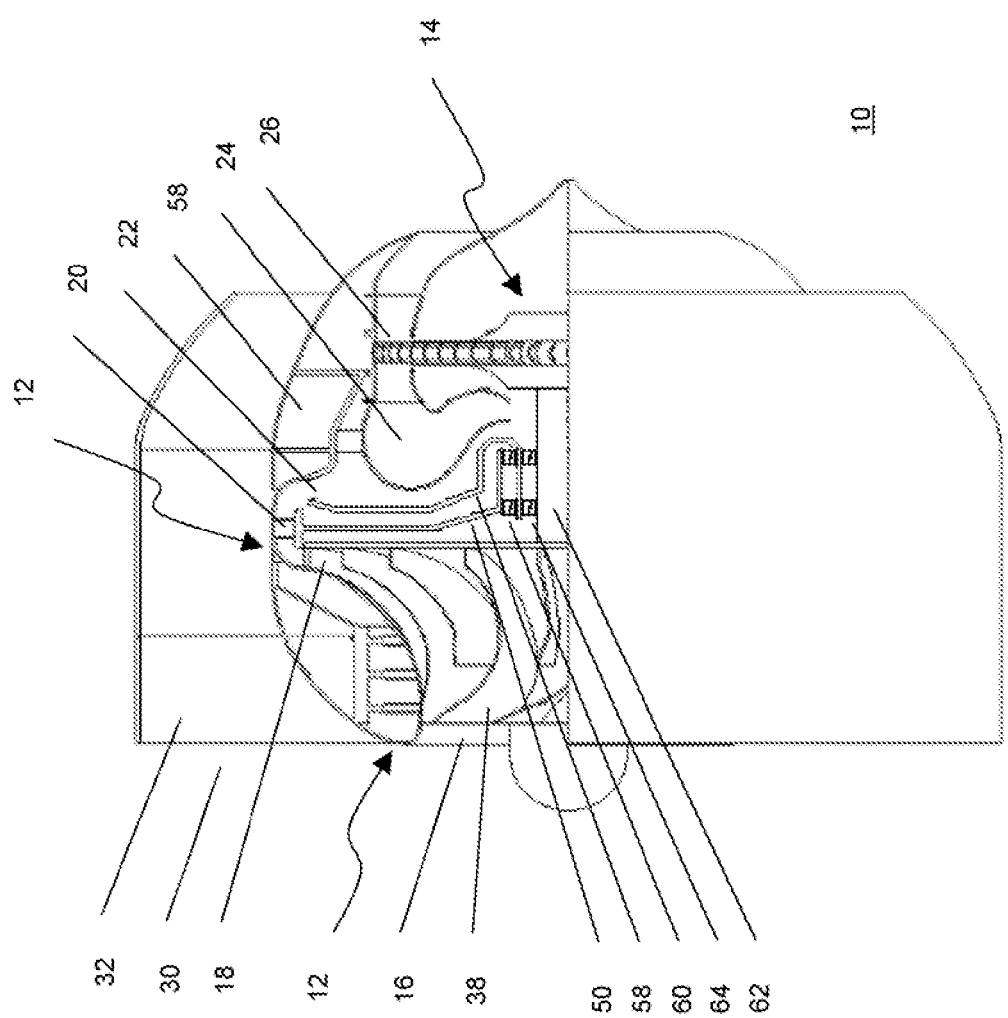
FIG. 5 is a cross-sectional view through the top half of the proposed aerodynamically coupled pre-combustion power turbine.
Figure 6:
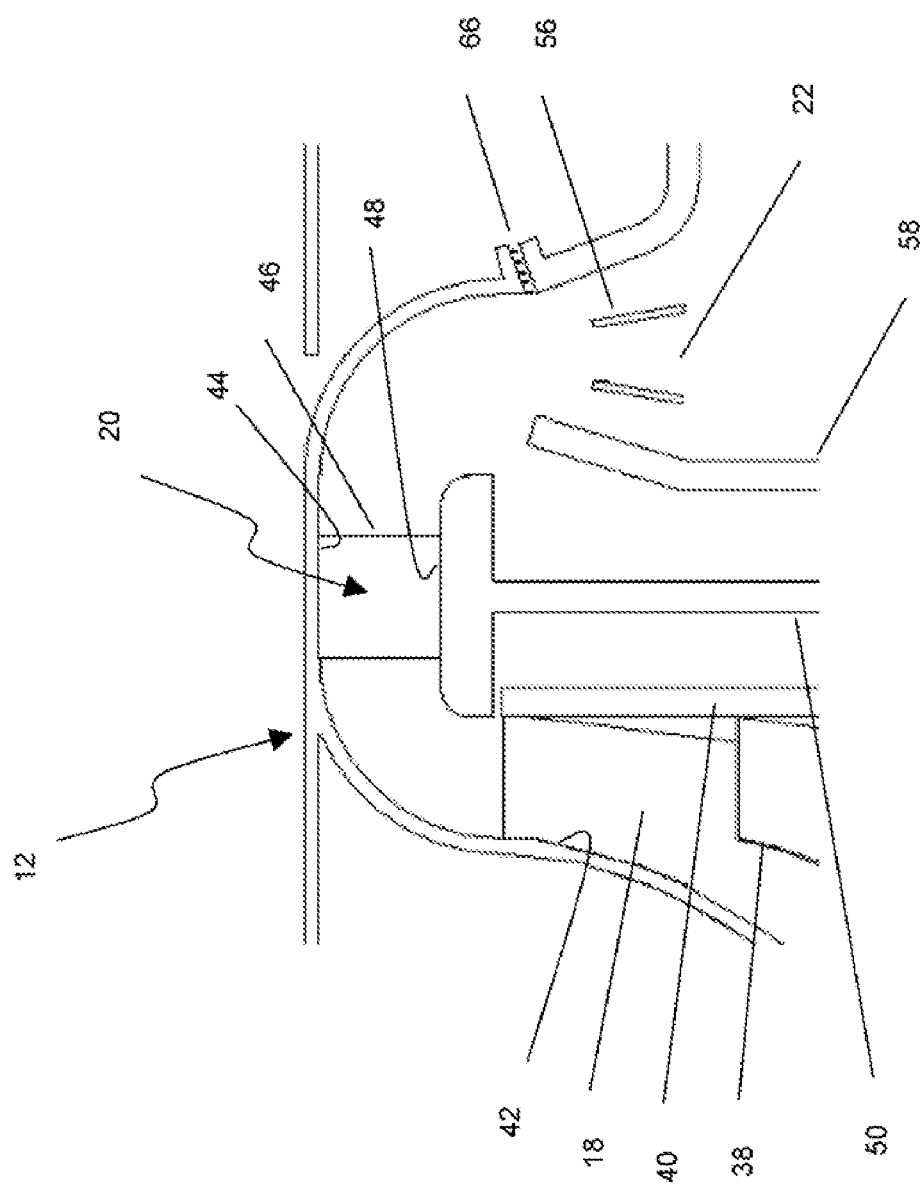
FIG. 6 is an enlarged cross-sectional view through the proposed aerodynamically coupled pre-combustion power turbine illustrated in FIG. 1. The enlargement focuses on the high-speed impeller exit and the low-speed power turbine.

FIGS. 4-6 show a partial section through the fixed structure (22, 24, 28, 36, 58), and the low-speed spool 12, except that the low-speed power turbine 20 is not sectioned so that it can be shown more clearly in relation to the high-speed compressor assembly IS.

Figure 7:
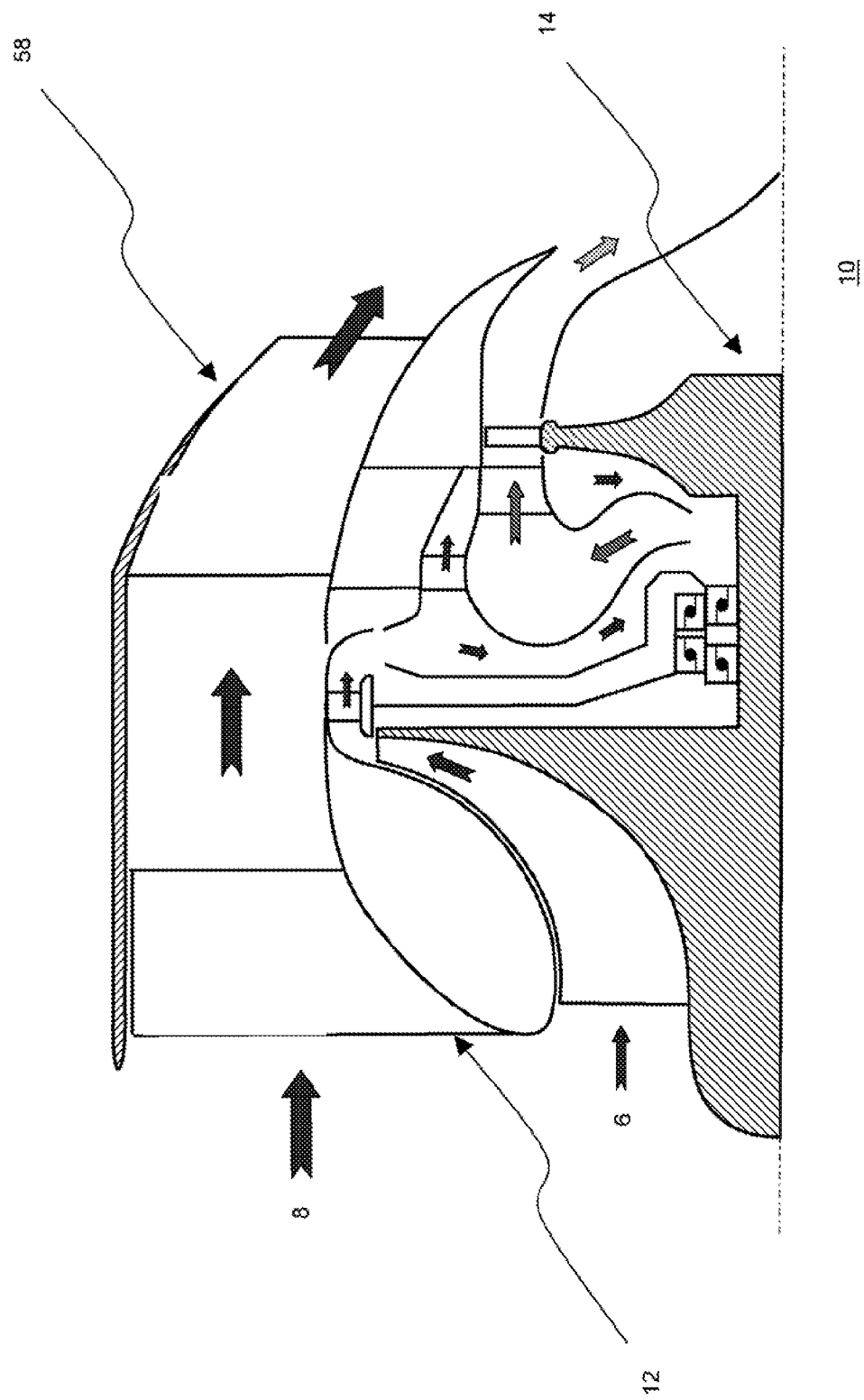
FIG. 7 is a cross-sectional view through the proposed aerodynamically coupled pre-combustion power turbine illustrating flow-path of the core and fan flow streams.

Referring now to FIG. 7 a cross-sectional view through the aerodynamically coupled pre-combustion power turbine 10 illustrates the flow-path of the core and fan flow streams 6, 8.

Figure 8:
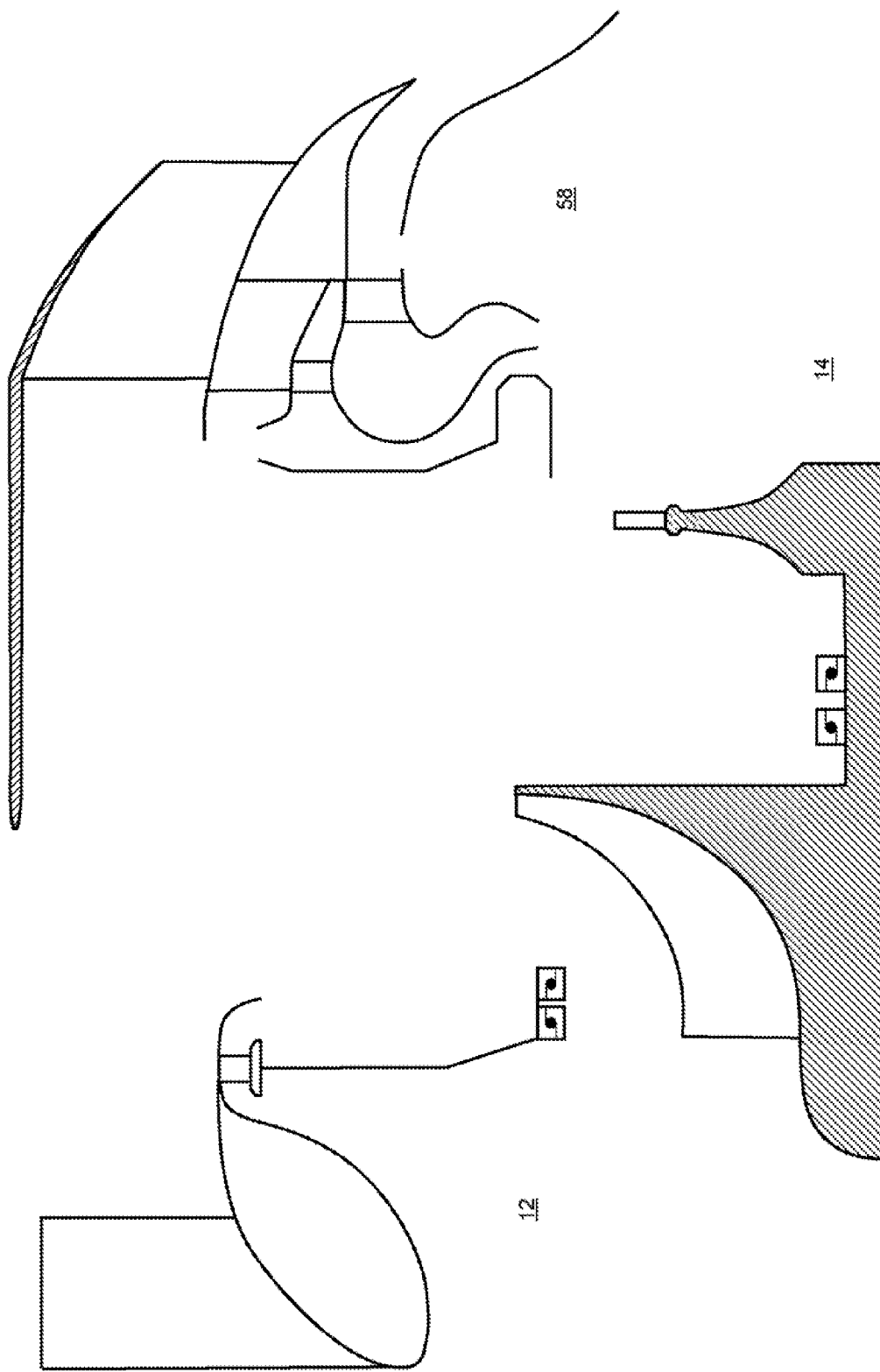
FIG. 8 is a series of decomposed sectional views through the proposed aerodynamically coupled pre-combustion power turbine illustrating the high-speed spool, the low-speed spool and the fixed engine structure.

FIG. 8 shows a series of decomposed sectional views through the proposed aerodynamically coupled pre-combustion power turbine 10, which illustrate the high-speed spool 14, the low-speed spool 12 and the fixed engine structure 58

Figure 9:
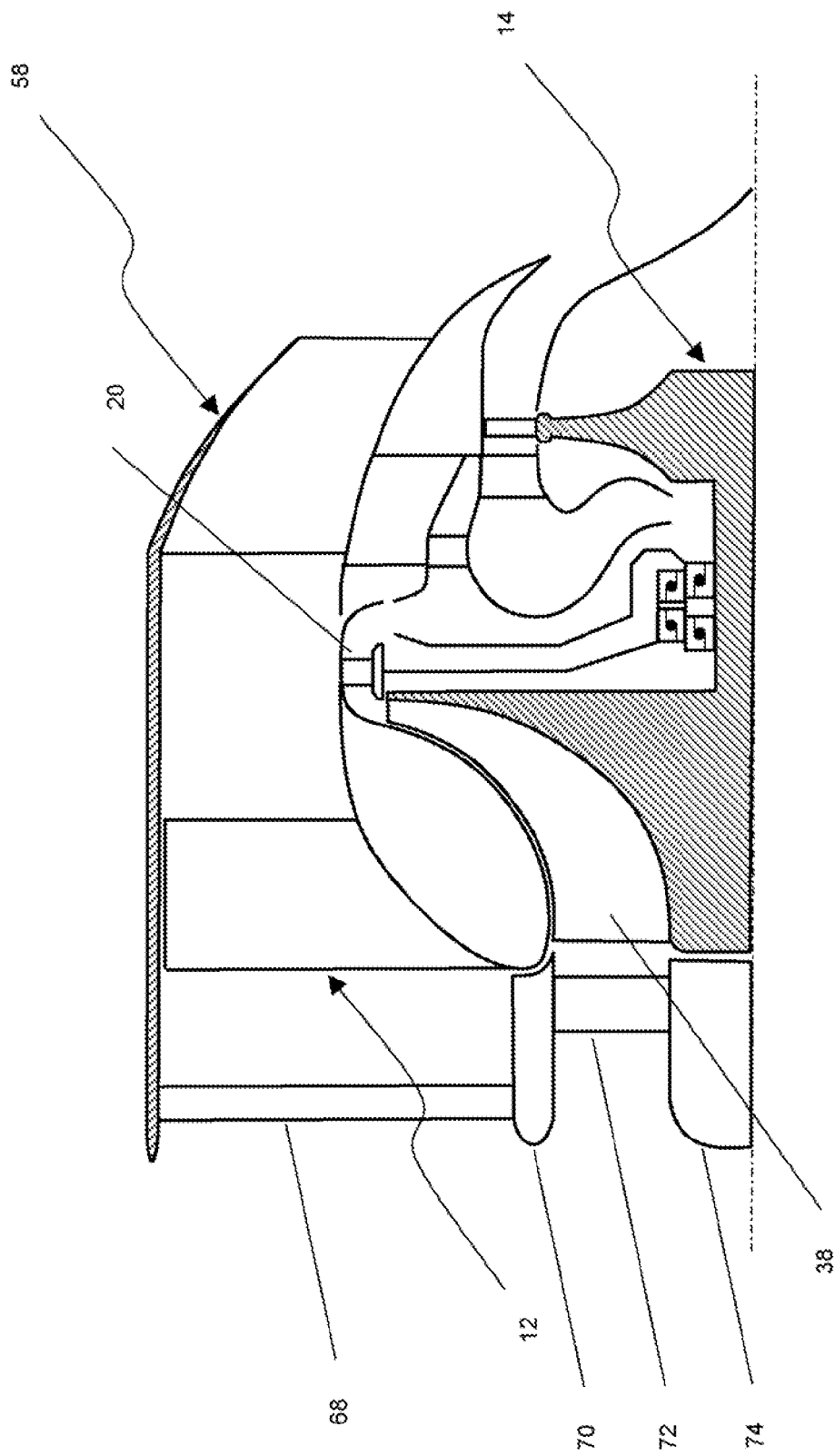
FIG. 9 is a cross-sectional view of an alternative configuration of the proposed aerodynamically coupled pre-combustion power turbine that utilizes core inlet guide vanes.

Referring now to FIG. 9, an alternative configuration of the aerodynamically coupled pre-combustion power turbine, where a series core-stream inlet guide vanes 72, are located upstream of the high-speed core impeller blades 38. The core-stream inlet guide vanes 72 are located between a core cowling 70, and a fixed core nose cone 74. The inlet guide canes 72 can be fixed or moveable, and can add swirl to the flow in the direction of rotation of the core impeller blades 38, or in the opposite direction. An upstream support structure 68 supports the core cowling 70.

Figure 10:
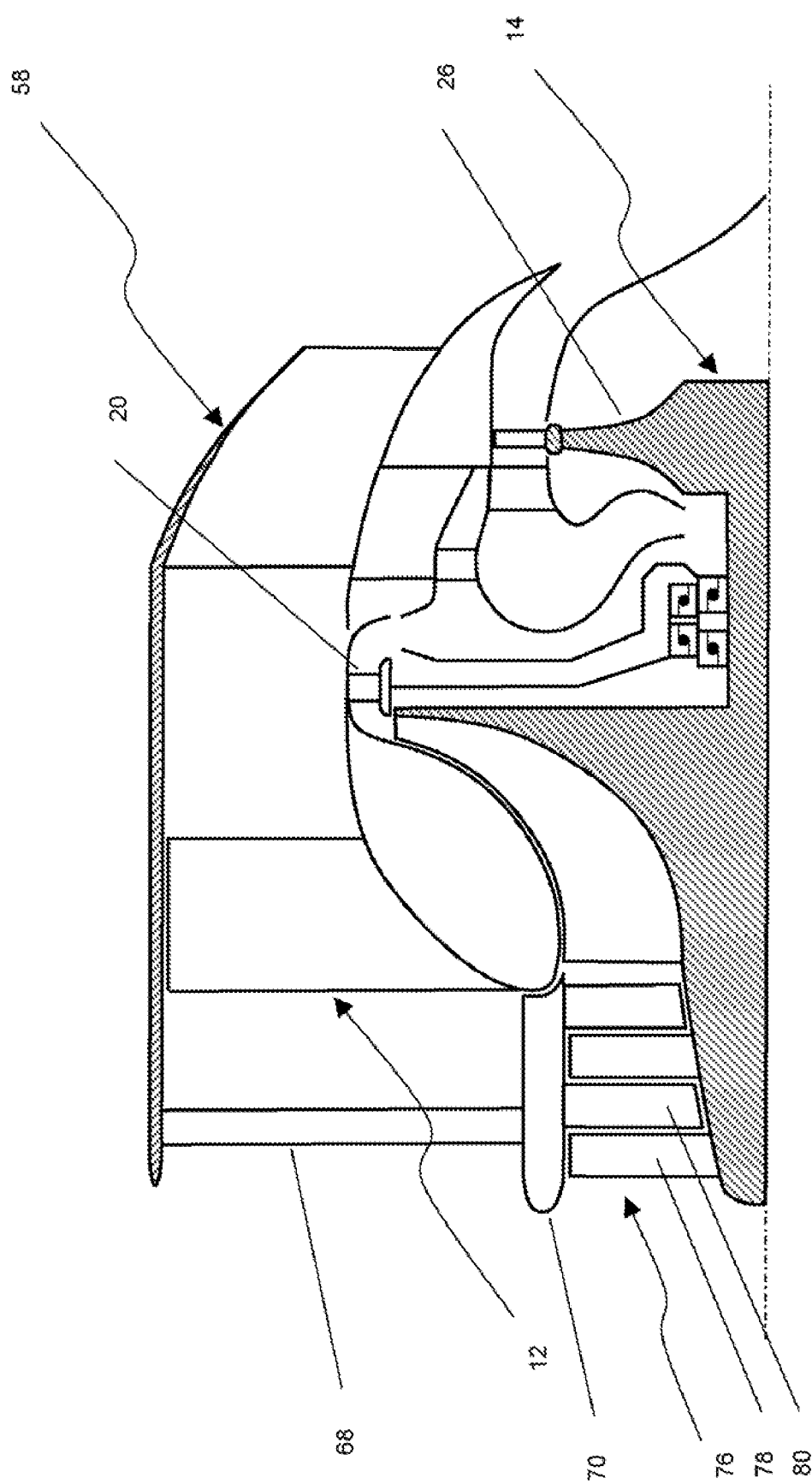
FIG. 10 is a cross-sectional view of an alternative configuration of the proposed aerodynamically coupled pre-combustion power turbine that utilizes a high-speed compressor assembly that is attached to the high-speed spool.
Figure 11:
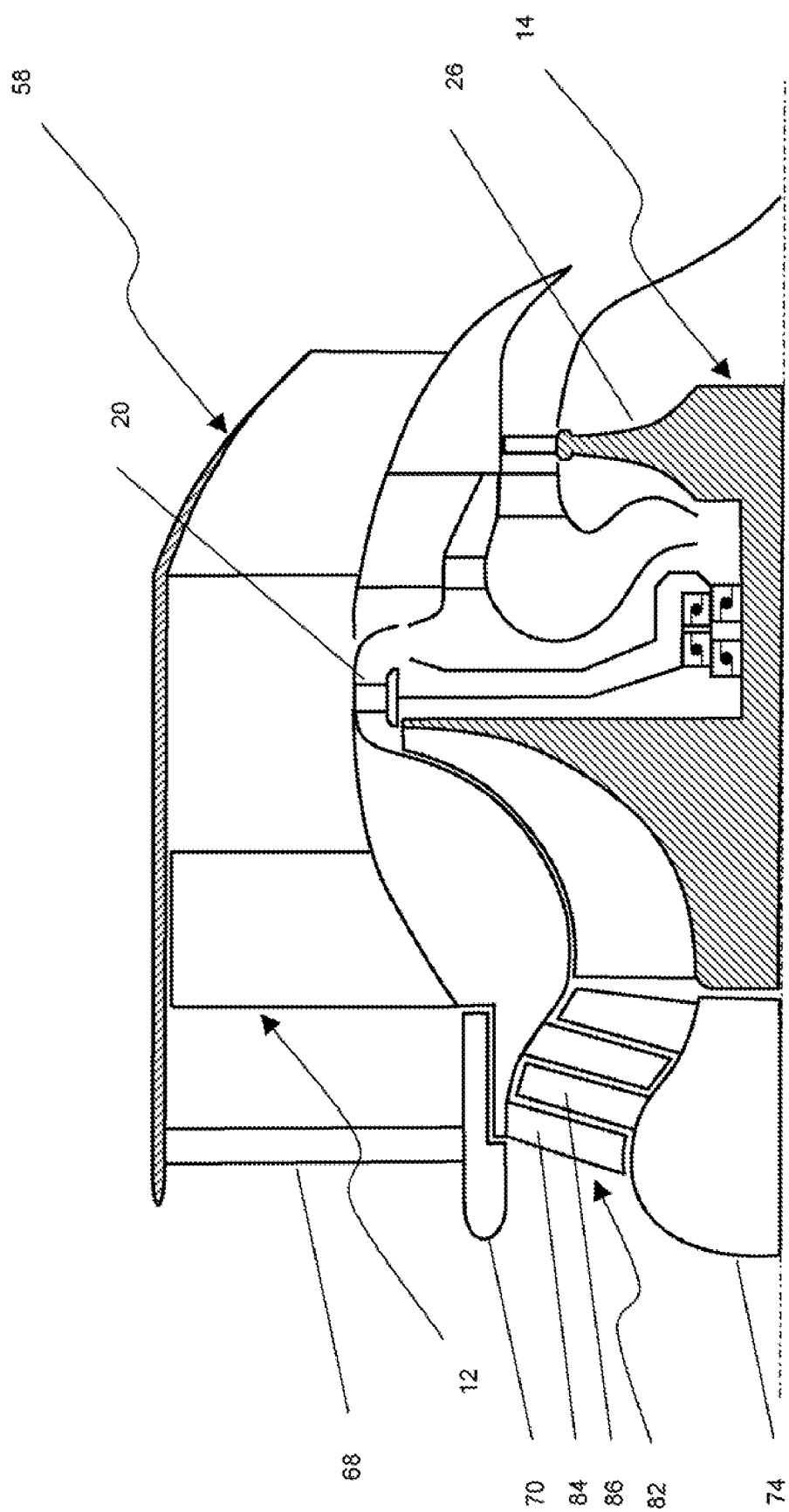
FIG. 11 is across-sectional view of an alternative configuration of the proposed aerodynamically coupled pre-combustion power turbine that utilizes a low-speed compressor that, is attached to the low-speed spool.

Referring to FIG. 10, an alternative configuration of the aerodynamically coupled pre-combustion power turbine includes a high-speed compressor assembly 76, which is located on an upstream side of the high-speed core spool 14. The high-speed compressor assembly 76, increases the engine overall pressure ratio. Alternatively, referring to FIG. 11, a low-speed compressor 82, is located on an upstream side of the low-speed spool 12, to increase the engine overall pressure ratio.

Figure 12:
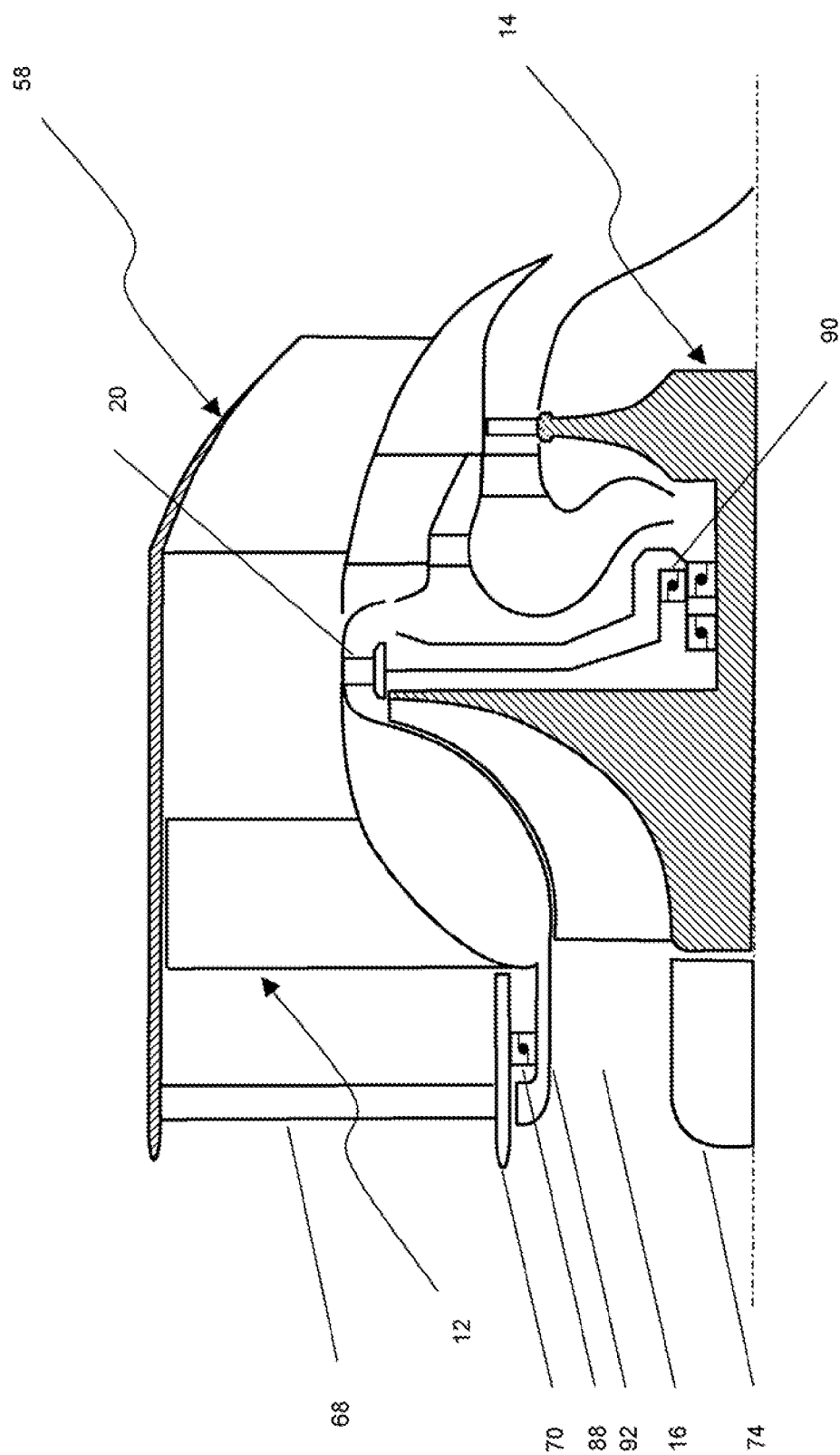
FIG. 12 is across-sectional view of an alternative configuration of the proposed aerodynamically coupled pre-combustion power turbine that utilizes an upstream fan bearing configuration to support the low-speed fan spool. The upstream fan bearing is located outside the core stream flow path.

Referring to FIG. 12, an alternative configuration of the aerodynamically coupled pre-combustion power turbine is shown, wherein the low-speed spool is supported by a front fan bearing 88, and an aft fan bearing 90. The front fan bearing 88 is located outside the high-speed core impeller inlet port 16.

Figure 13:
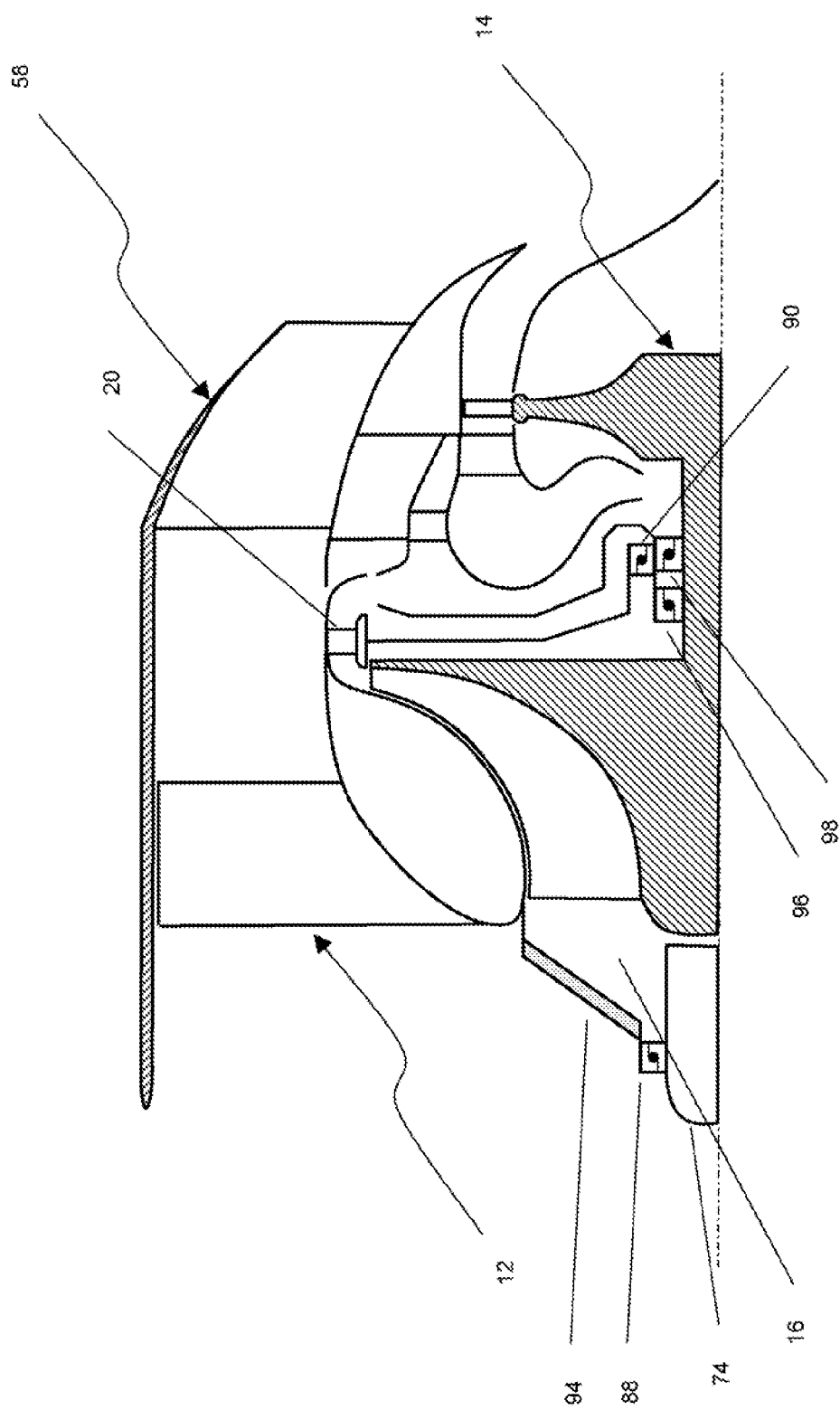
FIG. 13 is a cross-sectional view of an alternative configuration of the proposed aerodynamically coupled pre-combustion power turbine that utilizes an upstream fan bearing configuration to support the low-speed fan spool. The upstream fan bearing is located inside the core stream flow path.

Referring to FIG. 13, an alternative configuration of the aerodynamically coupled pre-combustion power turbine is shown, wherein the low-speed spool is supported by a front fan bearing 88, and an aft fan bearing 90. The front fan bearing 88 is located inside the high-speed core impeller inlet port 16. The front fan bearing 88 is connected to the fan spool 12, via a fan shaft with a plurality of core flow channels 94.

Figure 14:
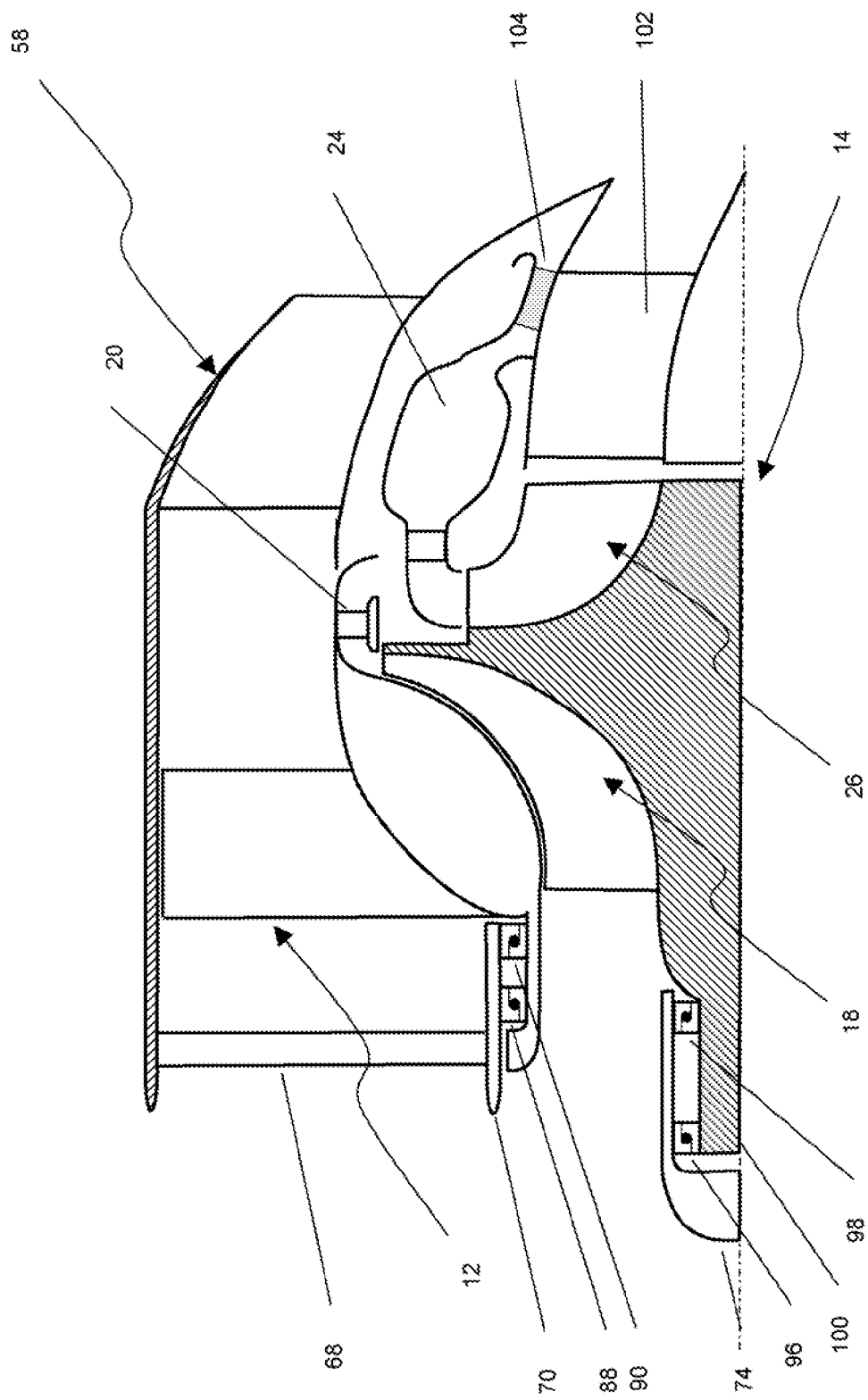
FIG. 14 is a cross-sectional view of an alternative configuration of the proposed aerodynamically coupled pre-combustion power turbine that utilizes mono-rotor core spool configuration. The core spool is supported by bearings located forward of the spool. The fan spool is supported by bearings located forward of spool.

Referring to FIG. 14, an alternative configuration of the aerodynamically coupled pre-combustion power turbine is shown, wherein the high-speed spool is of a mono-rotor configuration, where a high-speed compressor assembly 18, is integrated with a high-speed core turbine system 26. The high-speed spool 14 is supported by a core upstream shaft 100, and a front core bearing 96, and an aft core bearing 98. In this configuration the low-speed fan spool 12, is supported by a front fan bearing 88, and an aft fan bearing 90. In the present embodiment, a recuperator 104 is located at the inlet of the fixed combustion system 24. The recuperator 106, increases the temperature of the flow entering the combustion system 24, and thereby reduces the engine fuel consumption.

Figure 2:
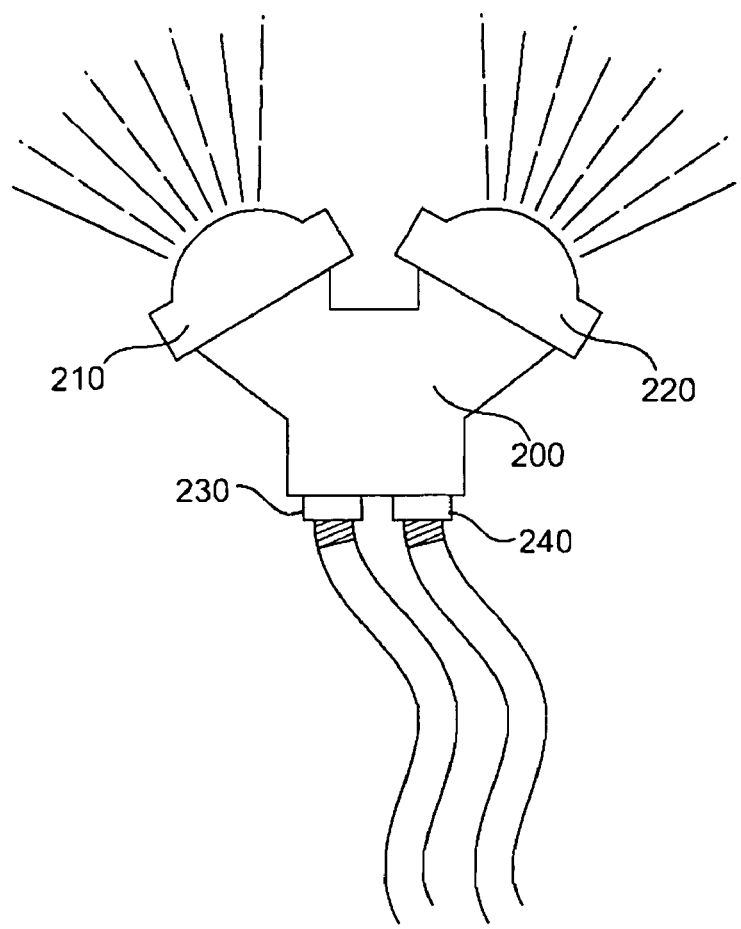
FIG. 2 is a decomposed fragmentary perspective view through the low-speed spool and a perspective view of the high-speed spool.
Figure 3:
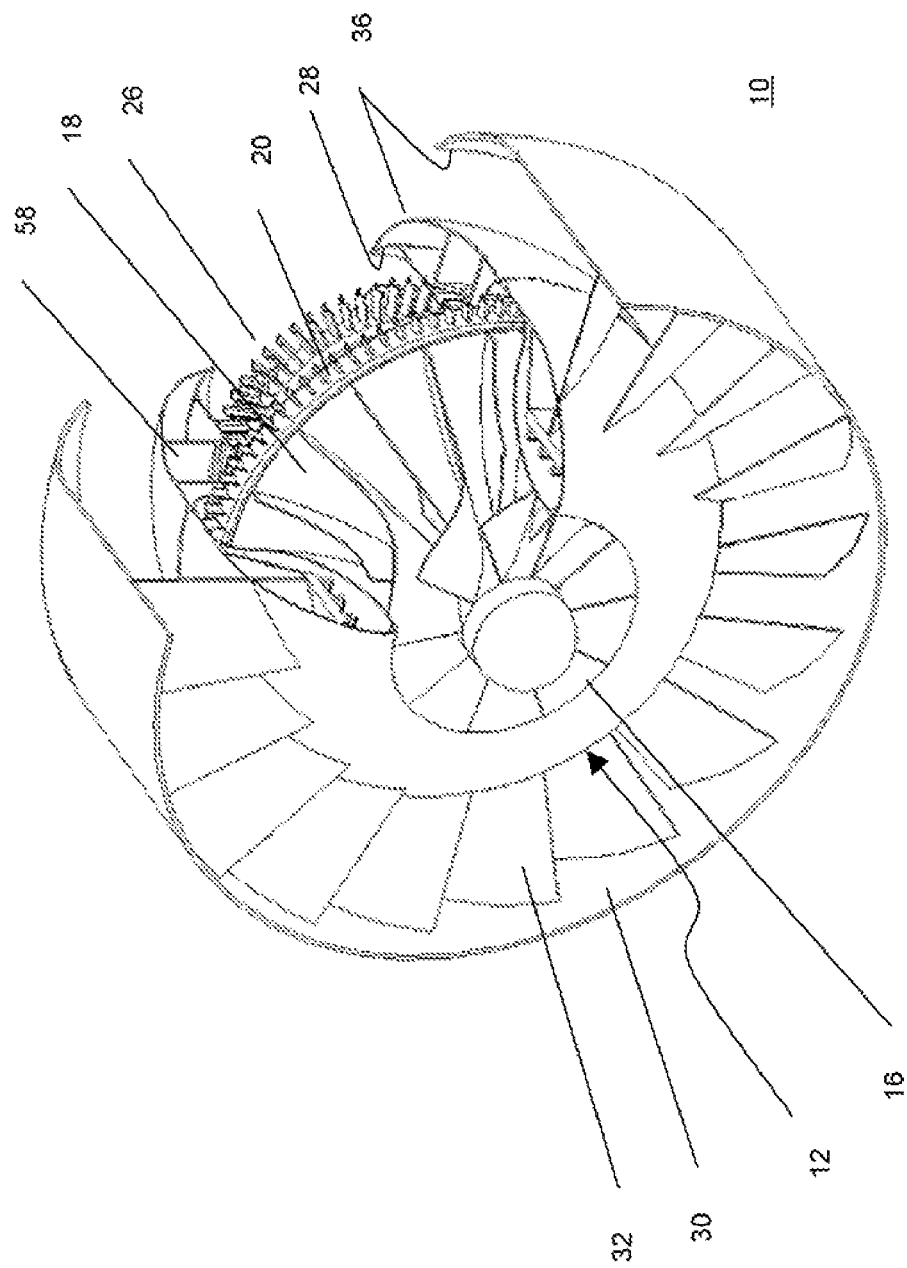
FIG. 3 is a fragmentary perspective view through the proposed aerodynamically coupled pre-combustion power turbine. Fragments are removed from the non-rotating structure and from the low speed fan spool to expose the engine core spoof as in FIG. 1, except that the low-speed power turbine is shown in full in order to more clearly illustrate its position relative to the high-speed impeller.

Alternatively the engine configuration as shown in FIGS. 1 and 2 could be combined with one or more additional axial or radial compressor stages upstream of the core compressor to increase the engine pressure ratio. This may be suited to engine configurations intended for longer range aircraft where the engine thrust-to-weight ratio is traded off against a higher core thermal efficiency. Axial stages would be particularly beneficial, as this would also reduce the frontal area of the engine core. Additional turbine stages would also be needed for higher engine pressure ratios.

The engine configuration as shown in FIGS. 1 and 2 is particularly suitable for smaller engines with relatively simple metallic turbine stages that do not use film-cooling technology or advanced high temperature materials. Metallic turbine stages are generally limited to turbine inlet temperatures of approximately 1250 K. Engine configurations using film-cooling technology or advanced ceramic components can run at much higher temperatures and can deliver much higher power levels from the core. Such configurations could use two or more coupled power turbine stages, using multiple low temperature power turbines.

Figure 15:
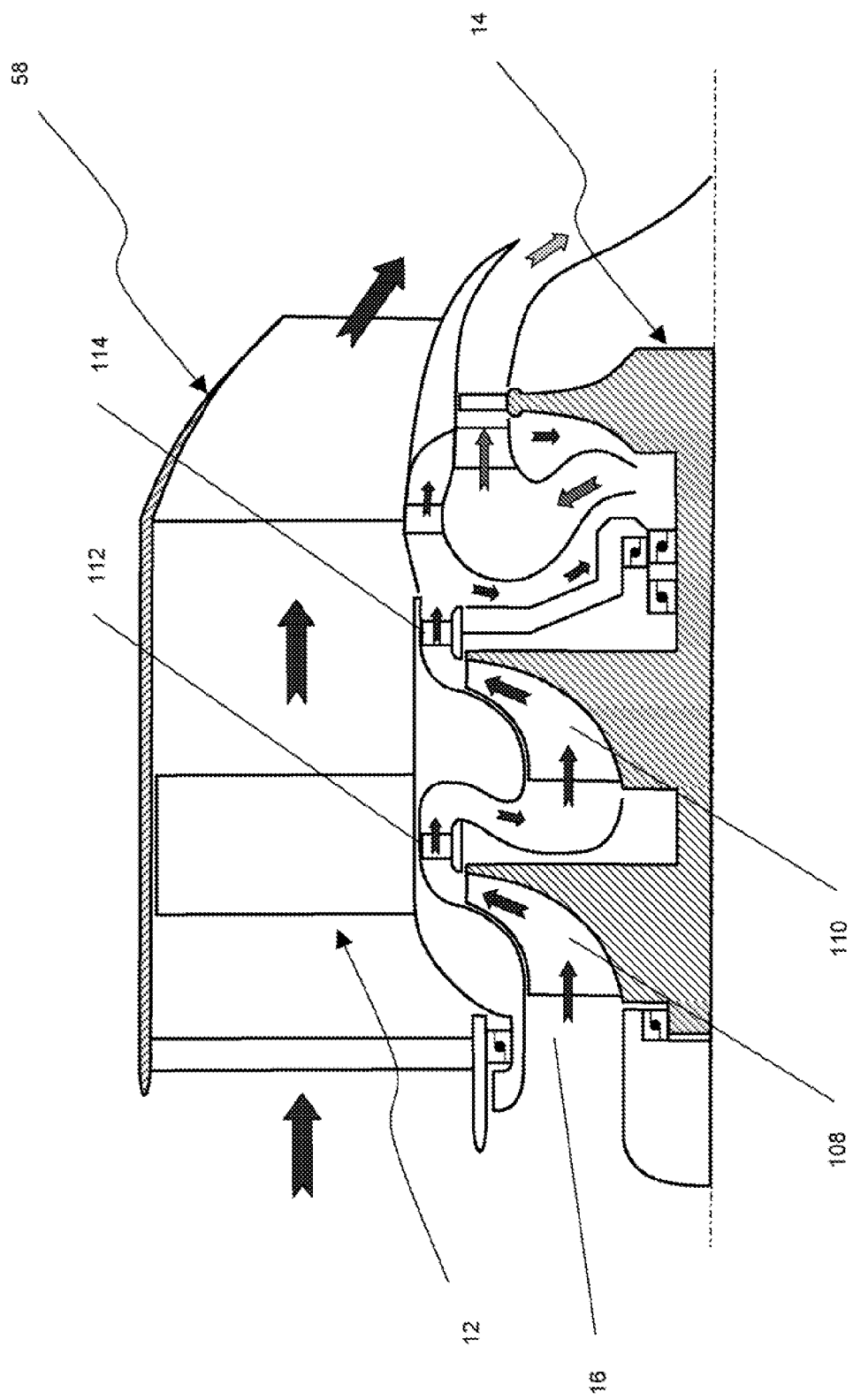
FIG. 15 is a cross-sectional view of an alternative configuration of the proposed aerodynamically coupled pre-combustion power turbine that utilizes multiple high-speed compressor assemblies operatively integrated with multiple co-rotating power turbines.

Referring to FIG. 15, an alternative configuration of the aerodynamically coupled pre-combustion power turbine is shown, wherein the high-speed core spool 14 has two high-speed compressor assemblies, a first stage high-speed compressor assembly 108, and a second high-speed compressor assembly 110, and is integrated with a high-speed core turbine system 26. Downstream of the first high-speed compressor assembly 108, is a first stage low-speed co-rotating power turbine 112, and downstream of the second stage high-speed compressor assembly 110, is a second low-speed co-rotating power turbine assembly 114. The first stage low-speed co-rotating power turbine 112, and the second stage low-speed co-rotating power turbine 114, are integrated info the low-speed fan spool 12.

Figure 16:
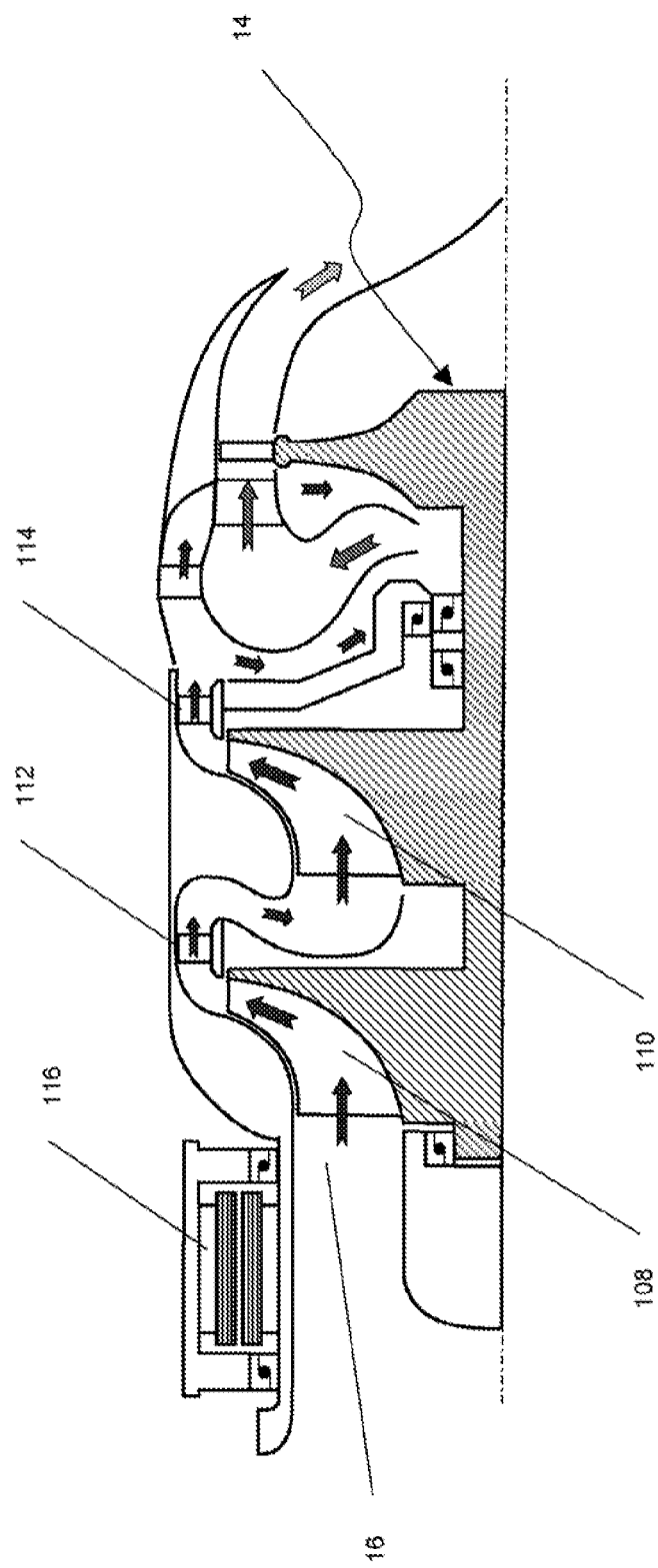
FIG. 16 is a cross-sectional view of an alternative configuration of the present invention wherein a pair of low-speed co-rotating power turbines is shown connected to a shaft that is connected to an external mechanical load.
Figure 1:
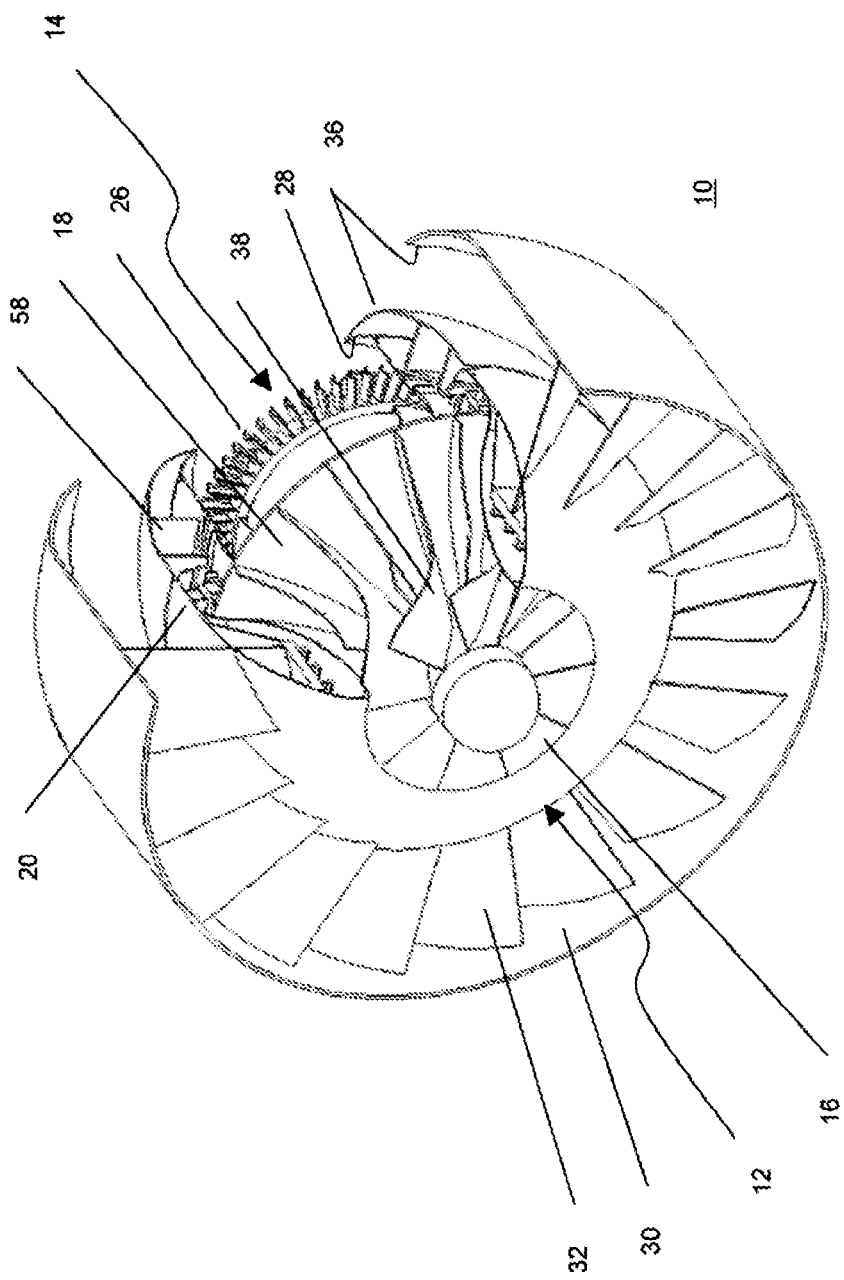
Figure 2:
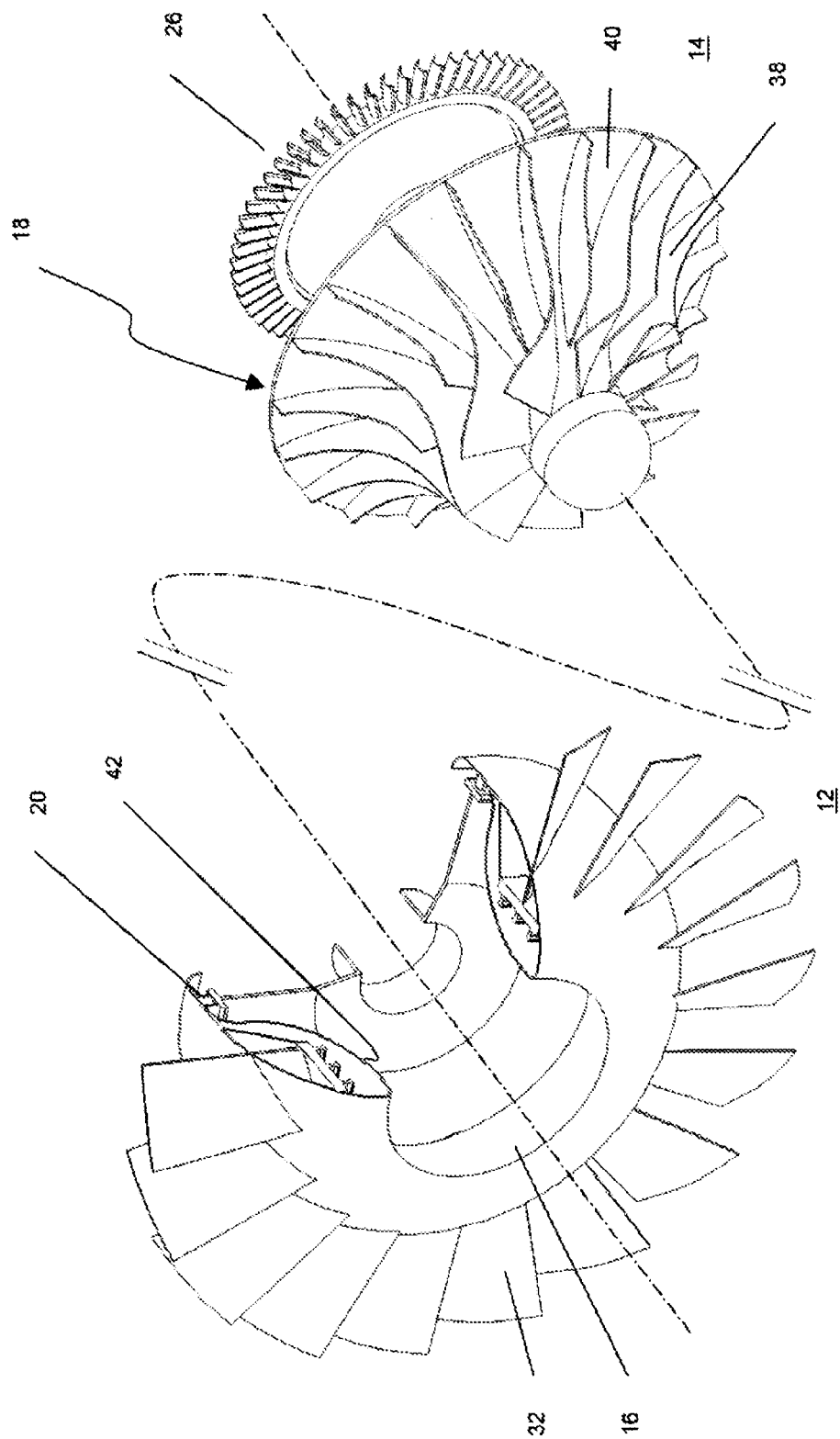

Referring to FIG. 16, an alternative configuration where the low-speed co-rotating power turbines 112, 114, are connected to a shaft 118, that is connected to an electrical generator 116. Alternatively, the shaft 118 may be connected to an external mechanical load.

The various embodiments of the present invention replaces the high temperature power turbine and shaft, and the stationary compressor diffuser found in typical turbofan engines with a low speed, low temperature power turbine. Replacing the conventional high temperature power turbine with a low temperature power turbine enables the use of high strength to weight ratio materials such as titanium or composite materials that cannot be used in high temperature applications. For example, certain applications could use an integrated fan and power turbine manufactured from injection molded short fiber reinforced thermoplastic materials, thereby enabling very inexpensive turbofan lift engines.

Although the preferred embodiments of the present invention have been described herein, the above descriptions are merely illustrative. Further modifications of the invention herein disclosed will occur to those skilled in the respective arts and all such modifications are deemed to be within the scope of the invention as defined by the appended claims.

What is claimed is:

1. A turbofan engine comprising:
a combustion chamber;
a fan assembly;

a pre-combustion power turbine directly upstream of the combustion chamber and operatively coupled to the fan to power the fan;

a high-speed core spool operatively coupled downstream of the combustion chamber to receive power therefrom, the high-speed core spool further operatively coupled to power the pre-combustion turbine; and wherein the high-speed core spool comprises a high-speed compressor assembly operatively coupled with a post-combustion turbine on the high-speed core spool.

2. The turbofan engine as claimed in claim 1 wherein the high-speed compressor assembly is aerodynamically coupled with the pre-combustion turbine.

3. The turbofan engine as claimed in claim 2 wherein the pre-combustion turbine is arranged to co-rotate with the high-speed compressor assembly.

4. The turbofan engine as claimed in claim 3 wherein the high-speed compressor assembly is arranged to discharge a high-velocity flow into the co-rotating pre-combustion turbine impeller, thereby powering the pre-combustion turbine.

5. The turbofan engine as claimed in claim 1 further comprising a low-speed spool assembly and a high-speed spool assembly, wherein the low-speed spool assembly comprises the pre-combustion turbine and the fan, and wherein the high-speed spool assembly comprises the high-speed core spool, where the high-speed core spool comprises a high-speed compressor assembly operatively connected with a high speed turbine, and wherein the high-speed compressor assembly is aerodynamically coupled with the pre-combustion turbine.

6. The turbofan engine as claimed in claim 1 wherein the high-speed compressor assembly includes a centrifugal impeller.

7. The turbofan engine as claimed in claim 1, further comprising a plurality of inlet vanes, wherein the inlet vanes are arranged to operatively direct an inlet flow into the high-speed compressor assembly.

8. The turbofan engine as claimed in claim 7, wherein the plurality of inlet vanes are variable, whereby the angle of the inlet flow may be adjusted.

9. A turbofan engine comprising:

a high-speed spool assembly comprising a core compressor and a high-speed turbine, wherein the high-speed turbine is arranged to receive and be powered by a post-combustion flow;

a low-speed spool assembly comprising a power turbine, wherein the power turbine is arranged to receive and be powered by a pre-combustion flow from the core compressor; and a combustion chamber configured to receive the pre-combustion flow and produce the post-combustion flow, wherein only a single spool assembly spans the combustion system.

10. The turbofan engine as claimed in claim 9, wherein the core compressor comprises a centrifugal impeller.

11. The turbofan engine as claimed in claim 9, wherein the power turbine is downstream of the core compressor.

12. The turbofan engine as claimed in claim 9, wherein the power turbine is upstream of the core compressor.

13. A turbofan engine comprising:

a combustion chamber;

a compressor assembly located upstream of the combustion chamber;

a high-speed turbine located downstream of the combustion chamber, the high-speed turbine attached to the compressor assembly by a high-speed spool;

a power turbine aerodynamically coupled between the compressor assembly and the combustion chamber, wherein the power turbine is arranged to co-rotate with the compressor assembly, and wherein the compressor assembly is arranged to discharge a high-velocity flow into the power turbine, thereby powering the turbine; and a fan assembly attached to the power turbine assembly by a low-speed spool, wherein the power turbine is the last rotating element of the turbofan engine upstream of the combustion chamber.

14. The turbofan engine as claimed in claim 13 wherein the power turbine is operatively coupled to power the fan assembly.

15. The turbofan engine as claimed in claim 13 wherein the power turbine is operatively coupled to power a generator.

16. The turbofan engine as claimed in claim 13 wherein the power turbine is operatively coupled to power an external mechanical load.

17. The turbofan engine as claimed in claim 13 further comprising at least one additional compressor assembly and at least one additional co-rotating turbine assembly operatively connected with the first said compressor assembly and the first said co-rotating turbine assembly.

* * * * *

UNITED STATES PATENT AND TRADEMARK OFFICE
CERTIFICATE OF CORRECTION

Page 1 of 3

PATENT NO.         : 7,849,669 B2
APPLICATION NO.    : 11/467913
DATED              : December 14, 2010
INVENTOR(S)        : Rory Keogh It is certified that error appears in the above-identified patent and that said Letters Patent is hereby corrected as shown below:

Drawings
Please replace original Sheet 1, containing Figures 1 and 2, with the attached two sheets of drawings, containing Figures 1 and 2.

Signed and Sealed this
Fifth Day of July, 2011

David J. Kappos
*Director of the United States Patent and Trademark Office*